United States Patent
Baba et al.

(10) Patent No.: US 10,400,750 B2
(45) Date of Patent: Sep. 3, 2019

(54) WIND TURBINE POWER GENERATING APPARATUS AND METHOD OF CONNECTING THE SAME

(71) Applicant: MITSUBISHI HEAVY INDUSTRIES, LTD., Tokyo (JP)

(72) Inventors: Mitsuya Baba, Tokyo (JP); Wakako Ariki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/141,015

(22) Filed: Apr. 28, 2016

(65) Prior Publication Data

US 2017/0074243 A1    Mar. 16, 2017

(30) Foreign Application Priority Data

Sep. 11, 2015   (JP) ................... 2015-179017

(51) Int. Cl.
  *F03D 7/02*   (2006.01)
  *F03D 7/04*   (2006.01)
  (Continued)

(52) U.S. Cl.
  CPC ........... *F03D 7/026* (2013.01); *F03D 7/0224* (2013.01); *F03D 7/0276* (2013.01);
  (Continued)

(58) Field of Classification Search
  CPC ........ F03D 7/026; F03D 9/255; F03D 7/0224; F03D 7/0276; F03D 7/0284; F03D 7/042;
  (Continued)

(56) References Cited

U.S. PATENT DOCUMENTS 4,193,005 A   3/1980 Kos et al.
6,571,027 B2  5/2003 Cooper et al.
(Continued)

FOREIGN PATENT DOCUMENTS

CA   2714852 A1   10/2010
EP   2112376 A2   10/2009
(Continued)

OTHER PUBLICATIONS

Europe Patent Office, "Search Report for European Patent Application No. 16166971.8," dated Jan. 30, 2017.
(Continued)

*Primary Examiner* — Tulsidas C Patel
*Assistant Examiner* — Joseph Ortega
(74) *Attorney, Agent, or Firm* — Manabu Kanesaka

(57) ABSTRACT

A wind turbine power generating apparatus includes a wind turbine rotor including at least one blade; a pitch drive part for changing a pitch angle of the at least one blade; a generator configured to be driven by rotational energy of the wind turbine rotor; a circuit breaker for switching a connection state of the generator with respect to a utility grid; and a controller for controlling the wind turbine power generating apparatus. The controller includes a pitch control part configured to control the pitch drive part in a constant rotation-speed control mode for maintaining a rotation speed of the wind turbine rotor at a target rotation speed, before connection of the generator; a connection-condition determination part configured to determine whether a connection determination condition is satisfied; and a connection-command generation part configured to provide the circuit breaker with a connection command to connect the generator to the utility grid.

16 Claims, 6 Drawing Sheets

(51) Int. Cl.
*F03D 9/00* (2016.01)
*F03D 9/25* (2016.01)

(52) U.S. Cl.
CPC .......... *F03D 7/0284* (2013.01); *F03D 7/042* (2013.01); *F03D 9/255* (2017.02); *F05B 2220/30* (2013.01); *F05B 2260/74* (2013.01); *F05B 2260/85* (2013.01); *F05B 2270/101* (2013.01); *F05B 2270/309* (2013.01); *F05B 2270/32* (2013.01); *F05B 2270/327* (2013.01); *F05B 2270/328* (2013.01); *F05B 2270/337* (2013.01); *Y02E 10/723* (2013.01)

(58) Field of Classification Search
CPC .............. F05B 2220/30; F05B 2260/74; F05B 2260/85; F05B 2270/101; F05B 2270/309; F05B 2270/32; F05B 2270/327; F05B 2270/328; F05B 2270/337; Y02E 10/723
See application file for complete search history.

(56) References Cited

U.S. PATENT DOCUMENTS

| | | | |
|---|---|---|---|
| 7,379,169 B1 | 5/2008 | Kraemer et al. | |
| 7,525,209 B2 | 4/2009 | Kabatzke et al. | |
| 7,667,343 B2 | 2/2010 | Oohara et al. | |
| 8,000,840 B2 | 8/2011 | Nielsen | |
| 8,039,980 B2 | 10/2011 | Mizoue et al. | |
| 8,232,662 B2* | 7/2012 | Baba | F03D 7/0224 290/44 |
| 8,255,173 B2 | 8/2012 | Fujioka et al. | |
| 8,339,691 B2 | 12/2012 | Tsukamoto | |
| 8,545,179 B2 | 10/2013 | Volanthen et al. | |
| 8,576,386 B2 | 11/2013 | Jones et al. | |
| 8,604,636 B2* | 12/2013 | Miyamoto | F03D 9/25 290/55 |
| 8,610,882 B2 | 12/2013 | Roberts et al. | |
| 8,702,388 B2 | 4/2014 | Garate Ivaro et al. | |
| 8,814,514 B2 | 8/2014 | Olesen | |
| 9,074,579 B2* | 7/2015 | Miyamoto | F03D 80/88 |
| 9,353,727 B2 | 5/2016 | Slot | |
| 9,388,753 B2* | 7/2016 | Prochaska | F02D 29/06 |
| 9,941,687 B2 | 4/2018 | Zhu et al. | |
| 2004/0057828 A1 | 3/2004 | Bosche | |
| 2007/0194574 A1 | 8/2007 | Kabatzke et al. | |
| 2008/0145007 A1 | 6/2008 | Crumpton | |
| 2009/0186740 A1* | 7/2009 | Saenz De Ugarte | F03D 9/25 475/331 |
| 2009/0246019 A1 | 10/2009 | Volanthen et al. | |
| 2009/0266160 A1* | 10/2009 | Jeffrey | G01H 1/006 73/455 |
| 2009/0315329 A1* | 12/2009 | Duffey | H02K 16/02 290/44 |
| 2010/0004878 A1 | 1/2010 | Volanthen et al. | |
| 2010/0054935 A1 | 3/2010 | Olesen | |
| 2010/0207396 A1* | 8/2010 | Simon | H02P 9/06 290/55 |
| 2011/0049886 A1* | 3/2011 | Becker | F03D 1/065 290/44 |
| 2011/0140423 A1* | 6/2011 | Menke | F03D 7/0224 290/44 |
| 2011/0204630 A1* | 8/2011 | Arinaga | F03D 7/0272 290/44 |
| 2011/0211200 A1 | 9/2011 | Cribbs | |
| 2011/0293418 A1* | 12/2011 | Baba | F03D 7/0268 416/1 |
| 2012/0035865 A1 | 2/2012 | Fujioka et al. | |
| 2012/0087792 A1* | 4/2012 | Cousineau | F03D 7/0224 416/1 |
| 2012/0104758 A1 | 5/2012 | Schietke | |
| 2012/0193922 A1* | 8/2012 | Barnard | F03B 13/264 290/53 |
| 2012/0292905 A1 | 11/2012 | Slot | |
| 2013/0214537 A1* | 8/2013 | Hashimoto | F03D 15/00 290/55 |
| 2013/0243624 A1* | 9/2013 | Schaefer | F03D 7/0224 417/410.1 |
| 2013/0287568 A1* | 10/2013 | Miranda | F03D 7/0224 416/1 |
| 2013/0298634 A1 | 11/2013 | Eden | |
| 2014/0054893 A1 | 2/2014 | Lindholdt et al. | |
| 2014/0090903 A1 | 4/2014 | Kraus | |
| 2014/0154075 A1* | 6/2014 | Kristoffersen | F03D 7/0224 416/1 |
| 2014/0178197 A1 | 6/2014 | Risager et al. | |
| 2015/0267686 A1* | 9/2015 | Kjær | F03D 7/0224 290/44 |
| 2015/0354534 A1* | 12/2015 | Pineda Amo | F03D 7/0224 416/1 |
| 2016/0118786 A1* | 4/2016 | Zhu | F03D 7/0244 290/44 |

FOREIGN PATENT DOCUMENTS

| | | |
|---|---|---|
| EP | 2354538 A1 | 8/2011 |
| EP | 2607694 A1 | 6/2013 |
| EP | 2615303 A1 | 7/2013 |
| EP | 2840257 A1 | 2/2015 |
| JP | S55-029085 A | 3/1980 |
| JP | 2005-351683 A | 12/2005 |
| JP | 2007-252028 A | 9/2007 |
| JP | 4951814 B2 | 6/2012 |
| JP | 5079092 B2 | 11/2012 |
| JP | 2014-500931 A | 1/2014 |
| JP | 2015-127558 A | 7/2015 |
| TW | 201126064 A1 | 8/2011 |
| WO | 2008/044074 A2 | 4/2008 |
| WO | 2009/095025 A1 | 8/2009 |
| WO | 2010/122658 A1 | 10/2010 |
| WO | 2010/150399 A1 | 12/2010 |
| WO | 2011/058170 A1 | 5/2011 |
| WO | 2012/100783 A2 | 8/2012 |
| WO | 2013/091541 A1 | 6/2013 |
| WO | 2013/091950 A1 | 6/2013 |
| WO | 2014/194464 A1 | 12/2014 |

OTHER PUBLICATIONS

Europe Patent Office, "Search Report for European Patent Application No. 16166967.6," dated Feb. 13, 2017.
Japan Patent Office, "Office Action for Japanese Patent Application No. 2015-179017," dated Nov. 6, 2017.
Japan Patent Office, "Office Action for Japanese Patent Application No. 2015-179016," dated Oct. 27, 2017.
U.S.P.T.O., "Office Action for U.S. Appl. No. 15/140,485," dated Dec. 26, 2017.
Japan Patent Office, "Office Action for Japanese Patent Application No. 2015-179018," dated Nov. 30, 2017.
Europe Patent Office, "Office Action for European Patent Application No. 16166967.6," dated Aug. 21, 2018.
Europe Patent Office, "Office Action for European Patent Application No. 16167105.2," dated Mar. 19, 2019.

* cited by examiner

WIND TURBINE POWER GENERATING APPARATUS AND METHOD OF CONNECTING THE SAME

RELATED APPLICATIONS

The present application is based on, and claims priority from, Japanese Application No. JP2015-179017 filed Sep. 11, 2015, the disclosure of which is hereby incorporated by reference herein in its entirety.

TECHNICAL FIELD

The present disclosure relates to a wind turbine power generating apparatus and a method of connecting the same.

BACKGROUND ART

Use of wind turbine power generating apparatuses has been promoted in recent years to preserve the environment, and a technique to connect a wind turbine power generating apparatus to a utility grid stably has been required.

Generally, to connect a wind turbine power generating apparatus to a utility grid to start power transmission, an anemometer disposed on an upper part of a wind turbine power generating apparatus (on a nacelle, for instance) firstly measures the wind speed around a wind turbine rotor, and if an average wind speed in a predetermined period exceeds a cut-in wind speed, the pitch angle of blades is changed from a feather side toward a fine side to start rotation of the wind turbine rotor, thereby starting the wind turbine power generating apparatus. When the rotation speed of the wind turbine rotor (or the rotation speed of a generator) reaches a connection rotation speed, the wind turbine power generating apparatus is connected to the utility grid.

For instance, Patent Document 1 discloses a method of changing the pitch angle of blades from the feather side toward the fine side at a constant rate, and matching a generator rotation speed with a connection rotation speed by adjusting the pitch angle if the generator rotation speed exceeds the connection rotation speed. Further, Patent Document 2 discloses a method of increasing the rotation speed of a wind turbine rotor by changing the pitch angle of blades from the feather side toward the fine side in stages before connection to a utility gird.

CITATION LIST

Patent Literature

Patent Document 1: US 2007/0194574
Patent Document 2: JP 5079092B

SUMMARY

As described above, when a wind turbine power generating apparatus is to be connected, a generator is connected to the utility grid at a rotation speed of a wind turbine rotor (or a generator rotation speed) being controlled to a rotation speed suitable for connection (connection rotation speed), so as not to negatively affect the utility grid. After connection, it is desirable to maintain the generator rotation speed to be at least a rotation speed at which the generator is to be disconnected (disconnection rotation speed), to stably continue a connected state of the wind turbine power generating apparatus.

However, there is a case in which a wind turbine power generating apparatus cannot be smoothly connected even if the rotation speed of the wind turbine rotor is satisfying a connection condition. For instance, if the wind speed is relatively low even though the generator rotation speed has reached the connection rotation speed, the generator rotation speed may decrease to the disconnection rotation speed or below immediately after connection of the generator, and the generator may disconnect shortly. Further, if the generator rotation speed reaches the connection rotation speed again after disconnection of the generator, the generator connected again. If the wind speed is continuously low, connection and disconnection may be repeated. As a result, a circuit breaker for controlling connection of the generator opens and closes frequently, which may shorten the lifetime of the circuit breaker.

In this regard, Patent Documents 1 and 2 disclose a method of increasing the rotation speed of the generator to a connection rotation speed suitably, but do not disclose a specific measure to avoid occurrence of disconnection immediately after connection, or repetitive disconnection and connection.

Further, conventionally, it is determined whether a wind turbine rotor can or cannot be started on the basis of a wind speed measured by an anemometer. In this case, it is difficult to accurately determine wind energy received by a wind turbine rotor as a whole. If the wind speed is measured by an anemometer at points, the wind speed may be greatly varied depending on the position of the anemometer even at the same time under great wind-shear condition (wind-speed variation in a vertical direction), which makes it difficult to start or connect a wind turbine power generating apparatus appropriately. For instance, even if a wind turbine power generating apparatus is started as a result of a determination that a sufficient wind speed can be obtained based on a wind speed measured by an anemometer, wind energy may be in fact insufficient for a wind turbine rotor as a whole, and the wind turbine power generating apparatus may disconnect soon after connection. Also in this case, the circuit breaker opens and closes unnecessarily for many times, which may shorten the lifetime of the circuit breaker.

In view of this, an object of at least some embodiments of the present invention is to provide a wind turbine power generating apparatus and a method of connecting the wind turbine power generating apparatus, whereby it is possible to avoid repetition of connection and disconnection upon connection of the wind turbine power generating apparatus, and to connect the wind turbine power generating apparatus to a utility grid smoothly.

(1) A wind turbine power generating apparatus, according to at least some embodiments of the present invention, is for generating electric power from wind energy, and comprises: a wind turbine rotor including at least one blade; a pitch drive part for changing a pitch angle of the at least one blade; a generator configured to be driven by rotational energy of the wind turbine rotor; a circuit breaker for switching a connection state of the generator with respect to a utility grid; and a controller for controlling the wind turbine power generating apparatus. The controller includes: a pitch control part configured to control the pitch drive part in a constant rotation-speed control mode for maintaining a rotation speed of the wind turbine rotor at a target rotation speed, before connection of the generator; a connection-condition determination part configured to determine whether a connection determination condition is satisfied, the connection determination condition including at least a first condition that, while the pitch drive part is controlled in the constant rotation-speed control mode, the pitch angle is at a feather side of a connection-determination pitch angle continuously for a period of $\Delta T_1$ or longer; and a connection-command generation part configured to provide the circuit breaker with a connection command to connect the generator to the utility grid, if the connection-condition determination part determines that the connection determination condition is satisfied.

It should be noted that the rotation speed of the wind turbine rotor and a rotation speed of the generator correspond to each other at a constant ratio, and thus the rotation speed of the generator may be used in actual control.

In the above configuration (1), the pitch control part controls the pitch drive part in the constant rotation-speed control mode for maintaining a rotation speed of the wind turbine rotor at a target rotation speed, before connection of the generator.

In this way, it is possible to prevent excessive rotation of the wind turbine rotor and to adjust the rotation speed of the wind turbine rotor to a target rotation speed suitable for connection of the generator. Further, as compared to synchronization in midst of an increase of the rotation speed, synchronization with a rotation speed controlled to be constant is relatively easy, which makes it possible to reduce the risk of synchronization failure.

Further, in the above configuration (1), the connection-condition determination part determines whether the connection determination condition including at least the first condition is satisfied, and if satisfied, the connection-command generation part provides the circuit breaker with a connection command to connect the generator to the grid. The first condition is a condition that, while the pitch drive part is being controlled in the constant rotation-speed control mode, the pitch angle is at a feather side of a connection determination pitch angle for a period of $\Delta T_1$ or longer.

As described above, in the constant rotation-speed control mode, the pitch angle is adjusted so as to maintain the rotation speed of the wind turbine rotor at a target rotation speed. Thus, a pitch angle at this time has a correlation with the wind speed (the wind speed and the pitch angle have a correlation). It should be noted that the wind speed here is not a wind speed at "a point" measured by an anemometer, but a wind speed received by "a plane" of the wind turbine rotor as a whole, which is wind energy received by the entire rotor plane of the wind turbine rotor. Utilizing this correlation, it is possible to determine, from a pitch angle, whether a sufficient wind speed is achieved for the entire rotor plane of the wind turbine rotor when the generator is to be connected. For instance, if the pitch angle is on the feather side of the connection-determination pitch angle for a predetermined period or longer, it can be determined that the wind turbine rotor is receiving sufficient wind energy. In this way, it is possible to prevent disconnection of the generator and repetition of disconnection and connection of the generator immediately after connection, which makes it possible to reduce switching frequency of the circuit breaker to prevent a decrease in the lifetime of the circuit breaker, and to maintain a stable connection state of the wind turbine power generating apparatus to the grid.

(2) In some embodiments, in the above configuration (1), the connection determination condition further includes a second condition that, while the pitch drive part is controlled in the constant rotation-speed control mode, a difference between the rotation speed of the wind turbine rotor and the target rotation speed is within an allowable range continuously for a period of $\Delta T_2$ or longer.

With the above configuration (2), the generator can be connected while the rotation speed of the wind turbine rotor is maintained to be a target rotation speed or a rotation speed close to the target rotation speed, which makes it possible to reduce the risk of failure in connection of the generator even more securely. For instance, if connecting operation is to be carried out after synchronization of voltage, frequency, and amplitude by a controller for controlling the circuit breaker (for instance, a converter controller), a high increase rate of the rotation speed due to a high wind speed during connection of a wind turbine power generating apparatus may make it difficult to synchronize voltage, frequency, and amplitude, and require a longer time to complete the connection, thus resulting in connection failure. In this regard, in the above configuration (2), the rotation speed of the wind turbine rotor is maintained to be a target rotation speed or a rotation speed close to the target rotation speed, which makes it possible for the controller to perform the connecting operation easily.

(3) In some embodiments, in the above configuration (1) or (2), the controller further includes a pitch-angle selection part configured to select the connection determination pitch angle to be used as the connection determination condition, from among a plurality of kinds of connection determination pitch angles.

With the above configuration (3), a connection determination pitch angle is suitably selected in accordance with a state (e.g. switching frequency) of the circuit breaker, which makes it possible to reduce unnecessary switching of the circuit breaker.

Further, a connection determination pitch angle used as the connection determination condition is selected from among a plurality of kinds of connection determination pitch angles, being changed suitably in accordance with experience. Accordingly, it is possible to set a suitable connection-determination condition corresponding to the surrounding environment of the wind turbine power generating apparatus.

(4) In an embodiment, in the above configuration (3), the pitch angle selection part is configured to select the connection determination pitch angle on the basis of a cumulative switching number of the circuit breaker.

With the above configuration (4), it is possible to reduce unnecessary switching of the circuit breaker more effectively.

For instance, if the cumulative switching number of the circuit breaker is close to a number corresponding to the lifetime, selecting a connection determination pitch angle closer to the feather side from among the plurality of kinds of connection determination pitch angles makes it possible to reduce the cumulative switching number of the circuit breaker securely and to extend the lifetime of the circuit breaker. In contrast, if the cumulative switching number of the circuit breaker is small and power generation is to be prioritized, a connection determination pitch angle closer to the fine side may be selected from among the plurality of kinds of connection determination pitch angles.

(5) In another embodiment, in any one of the above configurations (1) to (4), the controller further includes a smoothing part configured to smooth the pitch angle while the pitch drive part is controlled in the constant rotation-speed control mode to obtain a smoothed pitch angle, and the connection-condition determination part is configured to compare the smoothed pitch angle with the connection determination pitch angle in determination of whether the first condition is satisfied.

In the above configuration (5), the smoothed pitch angle, which is a pitch angle having been smoothed, and the connection determination pitch angle are compared, in determination of whether the first condition is satisfied. In this way, it is possible to determine a connection condition suitably even if the pitch angle changes while the pitch drive part is controlled in the constant rotation-speed control mode.

(6) In some embodiments, in any one of the above configurations (1) to (5), the controller further includes a stop-command generation part configured to generate a stop command for the wind turbine power generating apparatus to shift to a stop mode, if the rotation speed exceeds a threshold value greater than a connection schedule rotation speed at which the generator is to be connected.

If the rotation speed of the wind turbine rotor exceeds a threshold value set to be larger than the connection schedule rotation speed, there is a possibility that abnormality has occurred in the wind turbine power generating apparatus and the generator has not been connected smoothly.

With the above configuration (6), the wind turbine power generating apparatus is shifted to the stop mode if the generator rotation speed becomes excessively high. Thus, it is possible to prevent the wind turbine power generating apparatus from being connected to the utility grid while remaining in an abnormal state. If abnormality is not occurring in the wind turbine power generating apparatus, operation may be restarted after maintenance, for instance, which makes it possible to improve reliability of the wind turbine power generating apparatus.

(7) In some embodiments, in any one of the above configurations (1) to (6), the pitch control part includes a pitch rate limiter for limiting a change rate of the pitch angle changing toward a fine side after connection of the generator to be not greater than an upper limit value.

With the above configuration (7), after connection of the generator, over rotation of the generator is prevented even in a condition of a high wind speed, which enables smooth supply of electric power to the wind turbine power generating apparatus.

(8) In some embodiments, in any one of the above configurations (1) to (7), the controller further comprises a synchronization determination part configured to, if the connection command from the connection command generation part is received, determine whether a difference between a voltage, a phase, and a frequency of the generator and a voltage, a phase, and a frequency of the utility grid is within a synchronization-enabled range, and the circuit breaker is configured to be closed if the synchronization determination part determines that the difference is within the synchronization-enabled range.

With the above configuration (8), the generator is connected when the voltage, phase, and frequency of the generator are at appropriate values. Thus, it is possible to prevent a negative influence of connection from being imposed on the grid by the generator, which enables smooth connection of the wind turbine power generating apparatus.

(9) In some embodiments, in any one of the above configurations (1) to (8), the pitch control part is configured to control the pitch drive part so as to change the pitch angle toward a feather side to maintain the pitch angle at a standby pitch angle, if the rotation speed decreases to a disconnection rotation speed or lower and the generator is disconnected.

With the above configuration (9), even in a state in which the wind speed is low and the generator is disconnected, rotation of the wind turbine rotor is not stopped and the pitch angle is maintained at a standby pitch angle to maintain rotation of the wind turbine rotor. In this way, if the wind speed increases and connecting operation is to be carried out again, an inertial force is remaining as compared to a case in which the wind turbine rotor in a stopped state is to be rotated, and thus the rotation speed can be increased to a target rotation speed in a shorter time.

(10) A method of connecting a wind turbine power generating apparatus, according to at least some embodiments of the present invention, is for a wind turbine power generating apparatus comprising: a wind turbine rotor including at least one blade; a pitch drive part for changing a pitch angle of the at least one blade; a generator configured to be driven by rotational energy of the wind turbine rotor; and a circuit breaker for switching a connection state of the generator with respect to a utility grid, and comprises: a pitch control step of controlling the pitch drive part in a constant rotation-speed control mode for maintaining a rotation speed of the wind turbine rotor at a target rotation speed, before connection of the generator; a connection-condition determination step of determining whether a connection determination condition is satisfied, the connection determination condition including at least a first condition that, while the pitch drive part is controlled in the constant rotation-speed control mode, the pitch angle is at a feather side of a connection-determination pitch angle continuously for a period of $\Delta T_1$ or longer; and a connection-command generation step of providing the circuit breaker with a connection command to connect the generator to the utility grid, if the connection determination condition is determined to be satisfied in the connection-condition determination step.

According to the above method (10), in the pitch control step, the pitch drive part is controlled in the constant rotation-speed control mode for maintaining the rotation speed of the wind turbine rotor at a target rotation speed, before connection of the generator.

In this way, it is possible to avoid an excessive increase in the rotation speed of the wind turbine rotor, and to quickly adjust the rotation speed of the wind turbine rotor to a target rotation speed suitable for connection of the generator. Further, as compared to synchronization in midst of an increase of the rotation speed, synchronization with a rotation speed controlled to be constant is relatively easy, which makes it possible to reduce the risk of synchronization failure.

Further, according to the above method (10), it is determined whether the connection determination condition including at least the first condition is satisfied in the connection-condition determination step, and if satisfied, the circuit breaker is provided with a connection command to connect the generator to the grid in the connection-command generation step.

According to the above method, it is possible to determine, from a pitch angle, whether a sufficient wind speed is achieved for the entire rotor plane of the wind turbine rotor when the generator is to be connected. In this way, it is possible to prevent disconnection of the generator and repetition of disconnection and connection of the generator immediately after connection, which makes it possible to reduce switching frequency of the circuit breaker to prevent a decrease in the lifetime of the circuit breaker, and to maintain a stable connection state of the wind turbine power generating apparatus to the grid.

(11) In some embodiments, in the above method (10), the connection determination condition further includes a second condition that, while the pitch drive part is being controlled in the constant rotation-speed control mode, a difference between the rotation speed of the wind turbine rotor and the target rotation speed is within an allowable range continuously for a period of $\Delta T_2$ or longer.

According to the above method (11), the generator can be connected while the rotation speed of the wind turbine rotor is maintained to be a target rotation speed or a rotation speed close to the target rotation speed, which makes it possible to reduce the risk of failure in connection of the generator even more securely.

(12) In some embodiments, in the above method (10) or (11), the method further comprises a pitch-angle selection step of selecting the connection determination pitch angle to be used as the connection determination condition, from among a plurality of kinds of connection determination pitch angles.

According to the above method (12), a connection determination pitch angle is suitably selected in accordance with a state (e.g. switching frequency) of the circuit breaker, which makes it possible to reduce unnecessary switching of the circuit breaker.

Further, a connection determination pitch angle selected from among a plurality of kinds of connection determination pitch angles to be used as the connection determination condition is changed suitably in accordance with experience. Accordingly, it is possible to set a more suitable connection-determination condition corresponding to the surrounding environment of the wind turbine power generating apparatus.

(13) In an embodiment, in the above method (12), the pitch angle selection step comprises selecting the connection determination pitch angle on the basis of a cumulative switching number of the circuit breaker.

According to the above method (13), it is possible to reduce unnecessary switching of the circuit breaker more effectively. For instance, if the cumulative switching number of the circuit breaker is close to a number corresponding to the lifetime, selecting a connection determination pitch angle closer to the feather side from among the plurality of kinds of connection determination pitch angles makes it possible to reduce the cumulative switching number of the circuit breaker securely and to extend the lifetime of the circuit breaker. In contrast, if the cumulative switching number of the circuit breaker is small and power generation is to be prioritized, a connection determination pitch angle closer to the fine side may be selected from among the plurality of kinds of connection determination pitch angles.

(14) In an embodiment, any one of the above methods (10) to (13) further comprises a smoothing step of smoothing the pitch angle while the pitch drive part is controlled in the constant rotation-speed control mode to obtain a smoothed pitch angle, and the connection-condition determination step comprises comparing the smoothed pitch angle with the connection determination pitch angle in determination of whether the first condition is satisfied.

According to the above method (14), after connection of the generator, over rotation of the generator is prevented even in a condition of a high wind speed, which enables smooth supply of electric power to the wind turbine power generating apparatus.

(15) The pitch control step comprises limiting a change rate of the pitch angle toward a fine side after connection of the generator to be not greater than an upper limit value.

According to the above method (15), after connection of the generator, over rotation of the generator is prevented even in a condition of a high wind speed, which enables smooth supply of electric power to the wind turbine power generating apparatus.

According to at least some embodiments of the present invention, it is possible to prevent disconnection of the generator and repetition of disconnection and connection of the generator immediately after connection, which makes it possible to reduce switching frequency of the circuit breaker to prevent a decrease in the lifetime of the circuit breaker, and to maintain a stable connection state of the wind turbine power generating apparatus to the grid.

DETAILED DESCRIPTION

Embodiments of the present invention will now be described with reference to the accompanying drawings. It is intended, however, that unless particularly specified, dimensions, materials, shapes, relative positions and the like of components described in the embodiments shall be interpreted as illustrative only and not intended to limit the scope of the present invention unless particularly specified.

Figure 1:
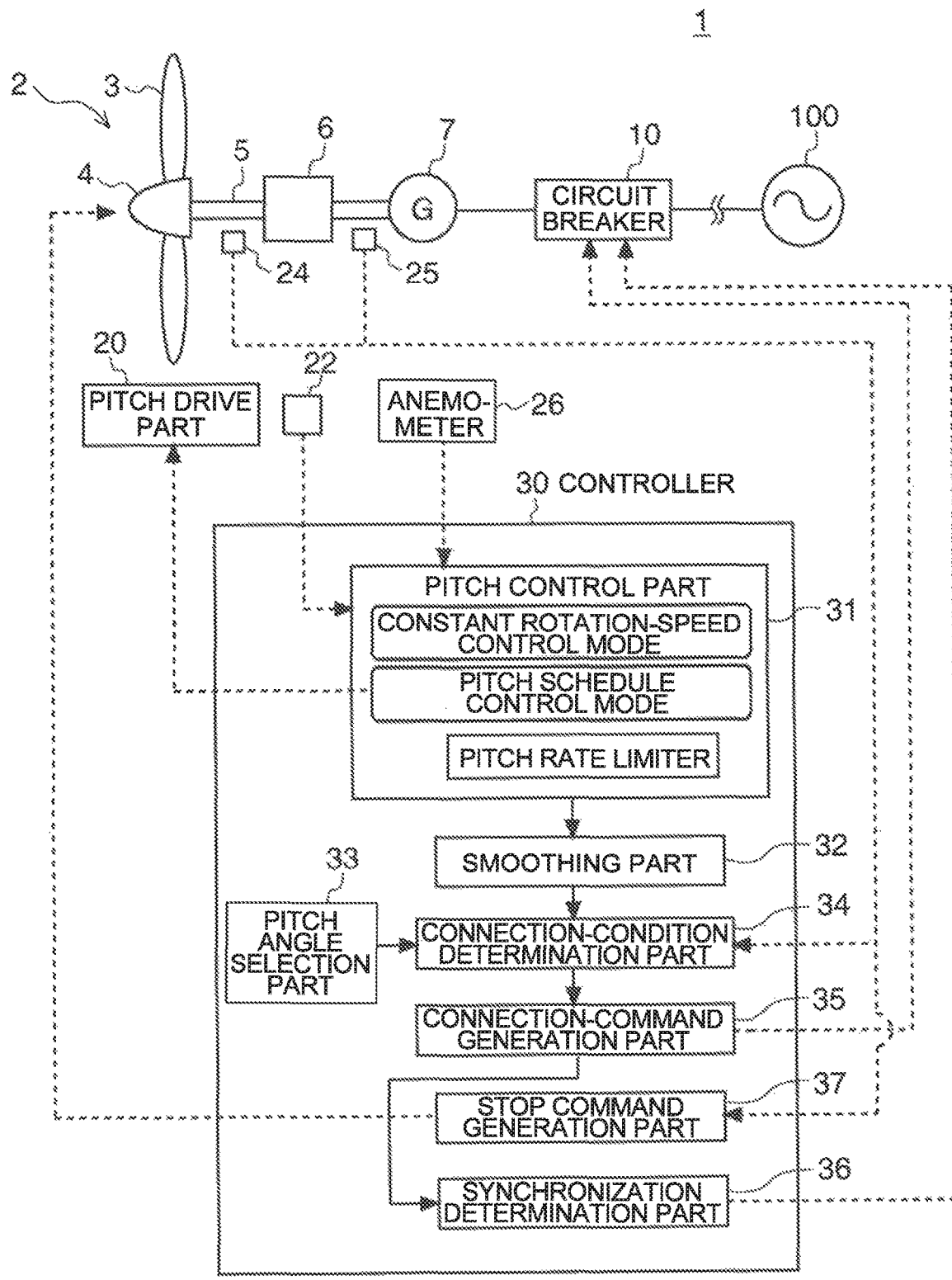
FIG. 1 is a block diagram of a schematic configuration of a wind turbine power generating apparatus according to an embodiment.
Figure 2:
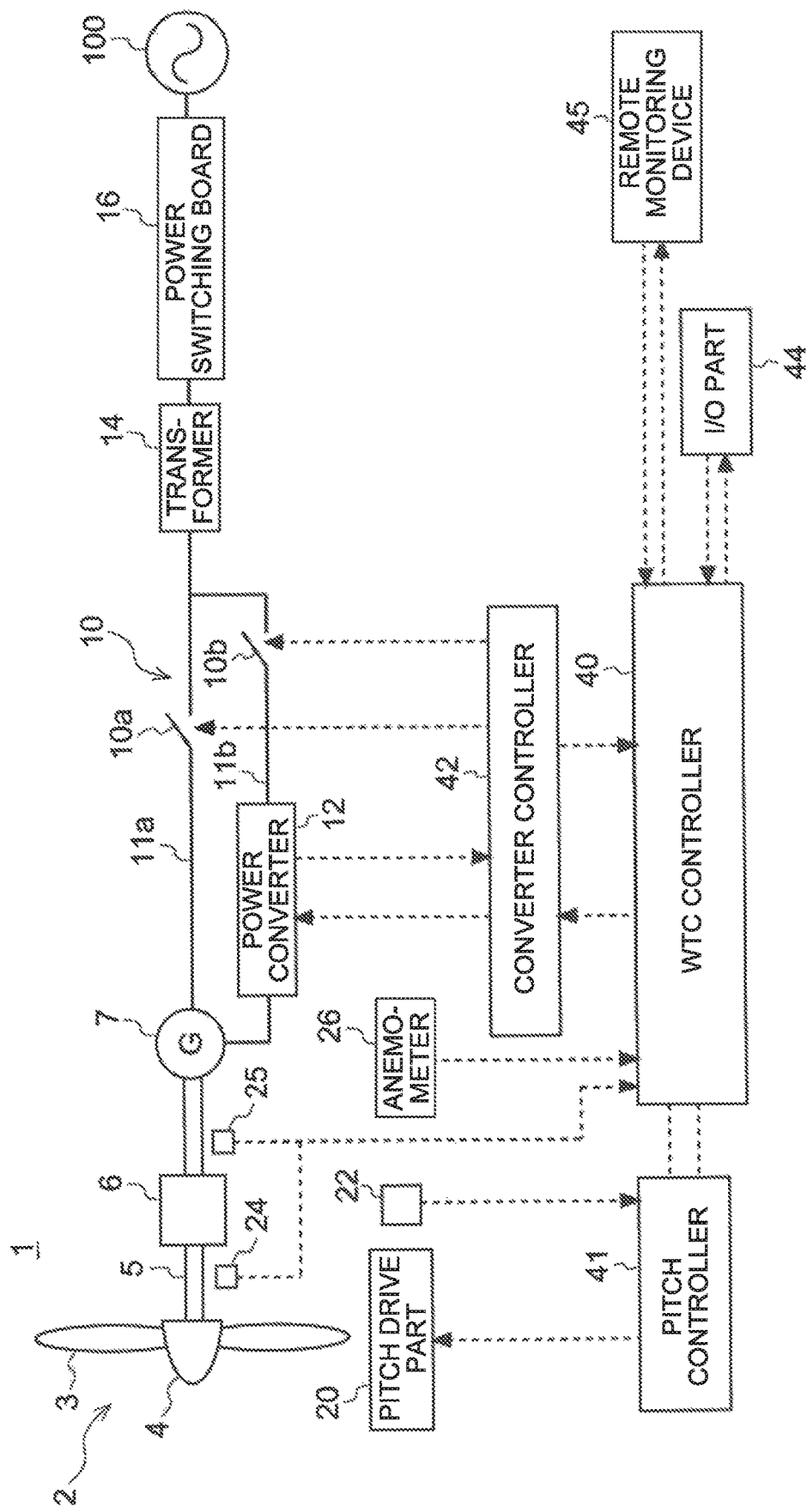
FIG. 2 is a block diagram of a specific configuration of a wind turbine power generating apparatus according to an embodiment.
Figure 3:
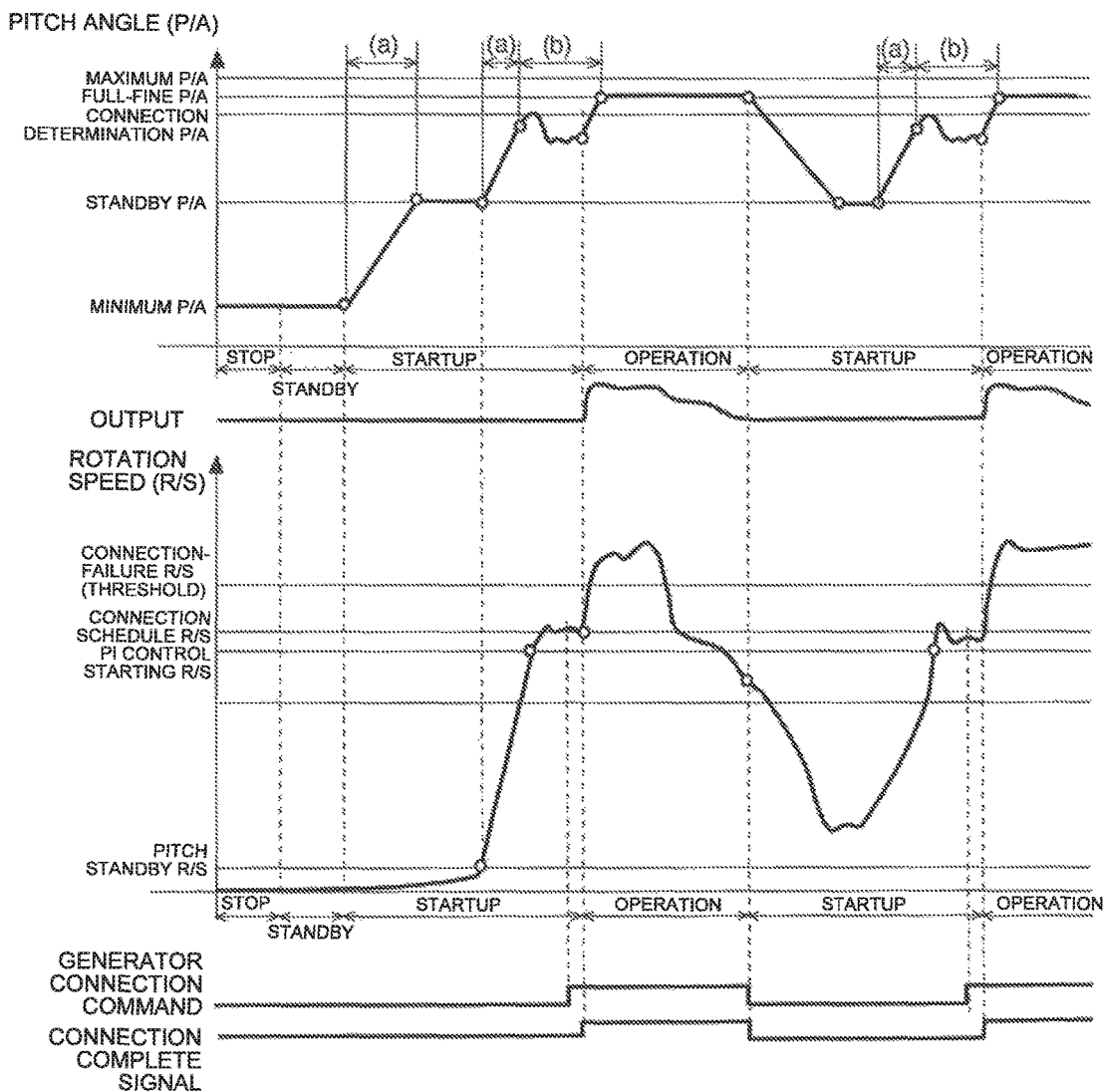
FIG. 3 is a time chart showing a time-series change of each parameter of a wind turbine power generating apparatus according to an embodiment.

Firstly, with reference to FIGS. 1 to 3, the overall configuration of a wind turbine power generating apparatus 1 according to some embodiments will be described. FIG. 1 is a block diagram of a schematic configuration of the wind turbine power generating apparatus 1 according to an embodiment. FIG. 2 is a block diagram of a specific configuration of the wind turbine power generating apparatus 1 according to an embodiment. FIG. 3 is a time chart showing a time-series change of each parameter of the wind turbine power generating apparatus 1 according to an embodiment.

As illustrated in FIGS. 1 and 2, the wind turbine power generating apparatus 1 according to some embodiments is configured to generate electric power from wind energy. More specifically, the wind turbine power generating apparatus 1 is provided as a power source of a dispersed power system and configured to be connectable to a grid (utility grid) 100. The wind turbine power generating apparatus 1 may be an offshore wind turbine power generating apparatus or an onshore wind turbine power generating apparatus.

In some embodiments, the wind turbine power generating apparatus 1 includes a wind turbine rotor 2, a pitch drive part 20, a generator 7, a circuit breaker 10, and a controller 30.

Further, the wind turbine power generating apparatus 1 may include a pitch-angle sensor 22 for detecting the pitch angle of a blade 3 of the wind turbine rotor 2, an anemometer 26 for measuring a wind speed in the vicinity of the wind turbine rotor 2, and at least one of a rotation-speed sensor 24 for detecting a rotation speed of the wind turbine rotor 2

(rotor rotation speed), or a rotation-speed sensor 25 for detecting a rotation speed of the generator 7 (generator rotation speed). Further, as the rotor rotation speed and the generator rotation speed correspond to each other at a constant ratio, either one may be used in the control. In the following embodiments, control using mainly the rotor rotation speed will be described. However, in actual control, the generator rotation speed may be used instead of the rotor rotation speed.

The wind turbine rotor 2 includes at least one blade 3. The wind turbine rotor 2 may include a part which rotates integrally with the at least one blade 3 when the at least one blade 3 receives wind. For instance, the wind turbine rotor 2 includes a plurality of blades 3 radially mounted to a hub 4, and is configured such that the blades 3 and the hub 4 integrally rotate when the blades 3 receive wind. The wind turbine rotor 2 may further include a main shaft 5 connected to the hub 4, in addition to the blades 3 and the hub 4.

The pitch drive part 20 is configured to change the pitch angle of the blades 3. Specifically, the pitch drive part 20 is a pitch actuator for changing the pitch angle of the blades 3 on the basis of a pitch command of the pitch control part 31 described below. For instance, the pitch drive part 20 may be a mechanical actuator such as a hydraulic cylinder and a pneumatic cylinder, or an electric actuator such as a servo motor.

Further, the pitch drive part 20 may be disposed inside the hub 4. In a case in which the wind turbine rotor 2 has a plurality of blades 3, the pitch drive part 20 may be disposed on each of the plurality of blades 3.

The generator 7 is configured to be driven by rotational energy of the rotor 2. The generator 7 may be an induction generator or a synchronous generator. In the embodiment illustrated in FIG. 2, the generator 7 is a secondary-winding induction generator. The secondary-winding induction generator 7 has a stator winding directly connected to a grid 100 and a rotor winding connected to the grid 100 via a power converter (e.g. AC-DC-AC converter) 12. The power converter 12 controls electric current of the rotor winding to adjust a generator torque, thereby enabling variable-speed operation, and also converts power received from the rotor winding of the secondary-winding induction generator 7 to AC that matches a frequency of the grid 100.

As illustrated in FIGS. 1 and 2, a drivetrain 6 may be disposed between the wind turbine rotor 2 and the generator 7. The drivetrain 6 may be a gear-type drivetrain, or a hydraulic transmission including a hydraulic pump and a hydraulic motor connected to each other through hydraulic lines. Alternatively, the wind turbine rotor 2 and the generator 7 may be coupled directly to each other.

The circuit breaker 10 is configured to switch a connection state of the generator 7 with respect to the grid 100. The circuit breaker 10 is controlled to open and close by a controller 30.

In the embodiment illustrated in FIG. 2, a stator circuit breaker 10a is disposed in a line 11a connected to the stator winding of the secondary-winding induction generator 7. Further, a rotor circuit breaker 10b is disposed in a line 11b connected to the rotor winding of the secondary-winding induction generator 7, at the grid 100 side of the power converter 12. The rotor circuit breaker 10b is controlled to open and close by a converter controller 42 described below.

Further, in the embodiment illustrated in FIG. 2, between the generator 7 and the grid 100, an electric transformer 14 for transforming AC voltage generated by the generator 7 and converted into AC by the power converter 12, and a power source switching board 16 for switching a load current in normal time are disposed.

The controller 30 is configured to control the wind turbine power generating apparatus 1. In an embodiment, the controller 30 includes a pitch control part 31, a connection-condition determination part 34, and a connection-command generation part 35. In the schematic diagram in FIG. 1, the controller 30 is depicted as a physically integrated object having a plurality of functions such as the pitch control part 31, the connection-condition determination part 34, and the connection-command generation part 35. However, the controller 30 may include a plurality of devices disposed physically distant from one another. For instance, in the embodiment illustrated in FIG. 2, the controller 30 (see FIG. 1) includes a WTC controller 40, a pitch controller 41, and the converter controller 42. In this case, the WTC controller 40 and the converter controller 42 may be disposed inside a nacelle, and the pitch controller 41 may be disposed inside the hub 4.

The pitch control part 31 controls the pitch drive part 20 in the constant rotation-speed control mode 50 (see FIG. 3) for maintaining the rotation speed of the wind turbine rotor 2 (rotor rotation speed) at a target rotation speed, before connection of the generator 7. Specifically, in the constant rotation-speed control mode in a no-load state, the pitch angle of the blades 3 is changed in accordance with the wind speed so that the wind turbine rotor maintains the target rotation speed.

In an embodiment, the pitch control part 31 is configured to control the pitch drive part 20 in accordance with a mode selected from a plurality of modes including the above constant rotation-speed control mode and a pitch-schedule control mode. A pitch schedule mode is a mode in which the pitch angle is changed from a feather side toward a fine side at one or more pitch rate set in advance, for instance. In the embodiment illustrated in FIG. 2, the pitch control part 31 (see FIG. 1) may be included in the pitch controller 41.

The connection-condition determination part 34 is configured to determine whether a connection-determination condition including at least the first condition is satisfied. The first condition is a condition that, while the pitch drive part 20 is being controlled in the constant rotation-speed control mode, the pitch angle is at a feather side of a connection determination pitch angle for a period of $\Delta T_1$ or longer. $\Delta T_1$ may be from 10 to 50 seconds. Alternatively, $\Delta T_1$ may be from 20 to 40 seconds. Further, $\Delta T_1$ may be variable and set suitably in accordance with experience, a wind-speed condition, or the like.

The connection-command generation part 35 provides the circuit breaker 10 with a connection command so as to connect the generator 7 is connected to the grid 100 if the connection-condition determination part 34 determines that the connection-determination condition is satisfied.

In the embodiment illustrated in FIG. 2, the connection-condition determination part 34 and the connection-command generation part 35 (see FIG. 1) may be included in the WTC controller 40.

In the above configuration, the pitch control part 31 controls the pitch drive part 20 in the constant rotation-speed control mode for maintaining the rotation speed of the wind turbine rotor 2 at a target rotation speed, before connection of the generator 7.

In this way, it is possible to avoid an excessive increase in the rotation speed of the wind turbine rotor 2, and to quickly adjust the rotation speed of the wind turbine rotor 2 to a target rotation speed suitable for connection of the generator 7. Further, as compared to connection in midst of an increase of the rotation speed, connection at a rotation speed controlled to be constant is relatively easy, which makes it possible to reduce the risk of connection failure.

Further, in the above configuration, the connection-condition determination part 34 determines whether the connection determination condition including at least the first condition is satisfied, and if satisfied, the connection-command generation part 35 provides the circuit breaker 10 with a connection command to connect the generator 7 to the grid 100.

As described above, in the constant rotation-speed control mode, the pitch angle is adjusted so as to maintain the rotation speed of the wind turbine rotor 2 at a target rotation speed. Thus, a pitch angle at this time has a correlation with the wind speed (the wind speed and the pitch angle have a correlation). It should be noted that the wind speed here is not a wind speed at "a point" measured by an anemometer, but a wind speed received by "a plane" of the wind turbine rotor as a whole, which is wind energy received by the entire rotor plane of the wind turbine rotor.

Figure 4:
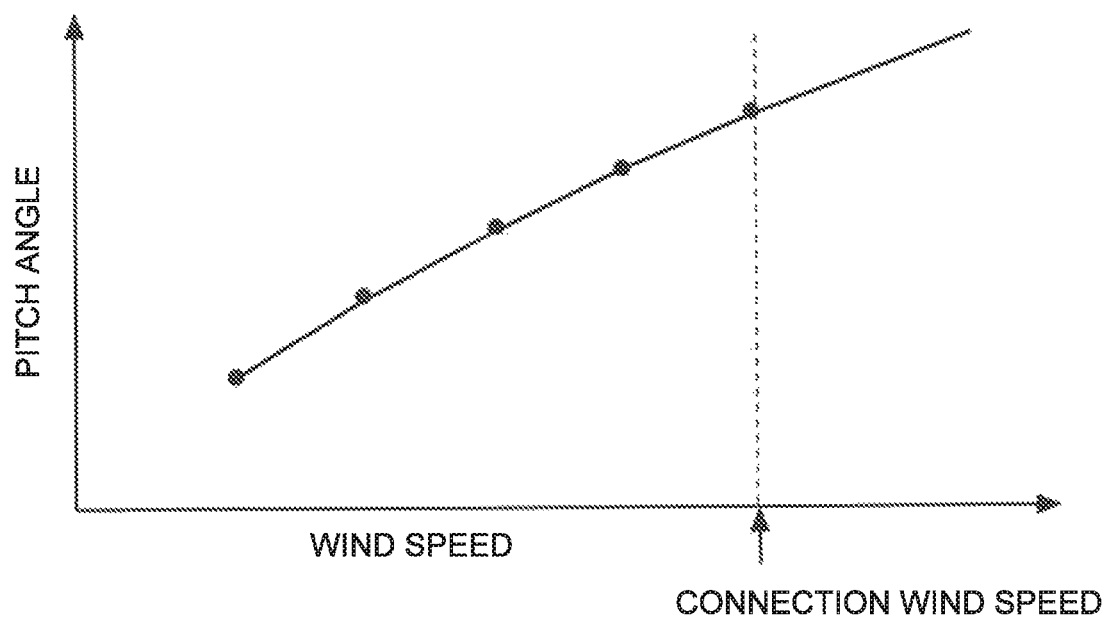
FIG. 4 is a graph showing a relationship between a wind speed and a pitch angle in a constant rotation-speed control mode.

FIG. 4 is a graph showing a relationship between a wind speed and a pitch angle in a constant rotation-speed control mode. As illustrated in the drawing, in the constant rotation-speed control mode, the pitch angle is changed in accordance with the wind speed so that the rotor rotation speed is at a constant value. Thus, the pitch angle and the wind speed have a proportional relationship.

Utilizing this correlation, it is possible to determine, from a pitch angle, whether a sufficient wind speed is achieved over the entire rotor plane of the wind turbine rotor 2 upon connecting the generator 7 illustrated in FIGS. 1 and 2. In other words, the pitch angle in the constant rotation-speed control mode is used as a conceptual anemometer for determining wind energy received by the entire rotor plane of the wind turbine rotor 2. For instance, if the pitch angle is on the feather side of the connection-determination pitch angle for a predetermined period or longer, it can be determined that the wind turbine rotor 2 is receiving sufficient wind energy. In this way, it is possible to prevent disconnection of the generator 7 and repetition of disconnection and connection of the generator 7 immediately after connection, which makes it possible to reduce switching frequency of the circuit breaker 10 to prevent a decrease in the lifetime of the circuit breaker 10, and to maintain a stable connection state of the wind turbine power generating apparatus 1 to the grid 100.

Further, the connection determination condition may further include the second condition that, while the pitch drive part 20 is controlled in the constant rotation-speed control mode, a difference between the rotation speed of the wind turbine rotor 2 and the target rotation speed falls within an allowable range for a period of $\Delta T_2$ or longer. $\Delta T_2$ may be from 10 to 50 seconds. Alternatively, $\Delta T_2$ may be from 20 to 40 seconds. Further, $\Delta T_2$ may be variable and set suitably in accordance with experience, a wind-speed condition, or the like.

With the above configuration, the generator 7 can be connected while the rotation speed of the wind turbine rotor 2 is maintained to be a target rotation speed or a rotation speed close to the target rotation speed, which makes it possible to reduce the risk of failure in connection of the generator 7 even more securely. For instance, if connecting operation is to be carried out after synchronization of voltage, frequency, and amplitude by a controller for controlling the circuit breaker 10 (for instance, the converter controller 42), a high increasing rate of the rotation speed due to a high wind speed during connection of a wind turbine power generating apparatus may make it difficult to synchronize the voltage, the frequency, and the amplitude and require a longer time to complete the connection, thus resulting in issuance of a connection-failure alert. In this regard, in the above configuration, the rotation speed of the wind turbine rotor 2 is maintained to be a target rotation speed or a rotation speed close to the target rotation speed, which makes it possible for the converter controller 42 to perform the connecting operation easily.

In some embodiments, in the wind turbine power generating apparatus 1 with the above configuration, the controller 30 may include at least one of a smoothing part 32, a pitch-angle selection part 33, a synchronization determination part 36, or a stop-command generation part 37.

The pitch-angle selection part 33 is configured to select a connection determination pitch angle to be used as a connection determination condition from among a plurality of kinds of connection determination pitch angles.

With the above configuration, a connection determination pitch angle is suitably selected in accordance with a state (e.g. the switching frequency) of the circuit breaker 10, which makes it possible to reduce unnecessary switching of the circuit breaker 10.

Further, a connection determination pitch angle selected from among a plurality of kinds of connection determination pitch angles to be used as the connection determination condition is changed suitably in accordance with experience. Accordingly, it is possible to set a more suitable connection-determination condition corresponding to the surrounding environment of the wind turbine power generating apparatus 1.

In this case, the pitch-angle selection part 33 may select a connection determination pitch angle in accordance with the cumulative switching number of the circuit breaker 10.

With the above configuration, it is possible to reduce unnecessary switching of the circuit breaker 10 more effectively. For instance, if the cumulative switching number of the circuit breaker 10 is close to a number corresponding to the lifetime, selecting a connection determination pitch angle closer to the feather side from among the plurality of kinds of connection determination pitch angles makes it possible to reduce the cumulative switching number of the circuit breaker 10 securely and to extend the lifetime of the circuit breaker 10. In contrast, if the cumulative switching number of the circuit breaker 10 is small and power generation is to be prioritized, a connection determination pitch angle closer to the fine side may be selected from among the plurality of kinds of connection determination pitch angles.

The smoothing part 32 is configured to smooth a pitch angle while the pitch drive part 20 is being controlled in the constant rotation-speed control mode, thereby obtaining a smoothed pitch angle. For instance, the smoothing part 32 includes a primary-delay lowpass filter and obtains a smoothed pitch angle by performing primary-delay lowpass filtering on pitch-angle data of a predetermined time obtained by the pitch-angle sensor 22.

In this case, the above connection-condition determination part 34 is configured to compare the smoothed pitch angle with the connection determination pitch angle, in determination of whether the first condition is satisfied.

In the above configuration, the smoothed pitch angle, which is a pitch angle having been smoothed, and the connection determination pitch angle are compared, in determination of whether the first condition is satisfied. In this way, it is possible to determine a connection condition suitably even if the pitch angle changes while the pitch drive part is controlled in the constant rotation-speed control mode.

The stop-command generation part 37 is configured to generate a stop command for causing the wind turbine power generating apparatus 1 to shift to a stop mode, if the rotation speed of the generator exceeds a threshold value greater than a connection schedule rotation speed at which the generator 7 is connected. A stop mode of the wind turbine power generating apparatus 1 is, for instance, a mode for stopping the wind turbine rotor 2 so that maintenance can be performed on the wind turbine power generating apparatus 1. In the embodiment illustrated in FIG. 2, the stop-command generation part 37 (see FIG. 1) may be included in the WTC controller 40. The WTC controller 40 may be configured such that data is transmittable between the WTC controller 40 and an input-output part 44 provided separately, such as a touch panel. Further, the WTC controller 40 may be configured such that data is transmittable between the WTC controller 40 and a remote monitoring device 45 installed on a place remote from the wind turbine power generating apparatus 1.

If the rotation speed of the wind turbine rotor 2 exceeds a threshold value set to be larger than the connection schedule rotation speed, there is a possibility that abnormality has occurred in the wind turbine power generating apparatus 1 and the generator 7 has not been connected smoothly.

With the above configuration, the wind turbine power generating apparatus 1 is shifted to the stop mode if the rotor rotation speed becomes excessively high. Thus, it is possible to prevent the wind turbine power generating apparatus 1 from being connected to the utility grid 100 while still being in an abnormal state. If abnormality is not occurring in the wind turbine power generating apparatus 1, operation may be restarted after maintenance, for instance, which makes it possible to improve reliability of the wind turbine power generating apparatus 1.

In an embodiment, the pitch control part 31 includes a pitch rate limiter for limiting a change rate of the pitch angle changing toward the fine side after connection of the generator 7 to be an upper limit value or lower.

With the above configuration, after connection of the generator 7, over rotation of the generator 7 is prevented even in a condition of a high wind speed, which enables smooth supply of electric power to the wind turbine power generating apparatus 1.

The synchronization determination part 36 is configured to determine whether a difference between the voltage, phase, and frequency of the generator 7 and those of the grid 100 have fallen in a synchronization-enabled range, in response to a connection command from the connection-command generation part 35. In the embodiment illustrated in FIG. 2, the synchronization determination part 36 (see FIG. 1) may be included in the WTC controller 40.

In this case, the circuit breaker 10 is configured to close if the synchronization determination part 36 determines that the difference has fallen in the synchronization-enabled range.

With the above configuration, the generator 7 is connected when the voltage, phase, and frequency of the generator 7 are at appropriate values. Thus, it is possible to prevent negative influence of connection from being imposed on the grid 100 by the generator 7, which enables smooth connection of the wind turbine power generating apparatus 1.

In an embodiment, the pitch control part 31 is configured to control the pitch drive part 20 so that, when the rotation speed of the wind turbine rotor 2 decreases to a disconnection rotation speed or lower and the generator 7 disconnects, the pitch angle changes to the feather side to be maintained at a standby pitch angle.

With the above configuration, even in a state in which the wind speed is low and the generator 7 is disconnected, rotation of the wind turbine rotor 2 is not stopped and the pitch angle is maintained at a standby pitch angle to maintain rotation of the wind turbine rotor 2. In this way, if the wind speed increases and connecting operation is to be carried out again, an inertial force is remaining as compared to a case in which the wind turbine rotor 2 in a stopped state is to be rotated, and thus the rotation speed can be increased to a target rotation speed in a shorter time.

Figure 5:
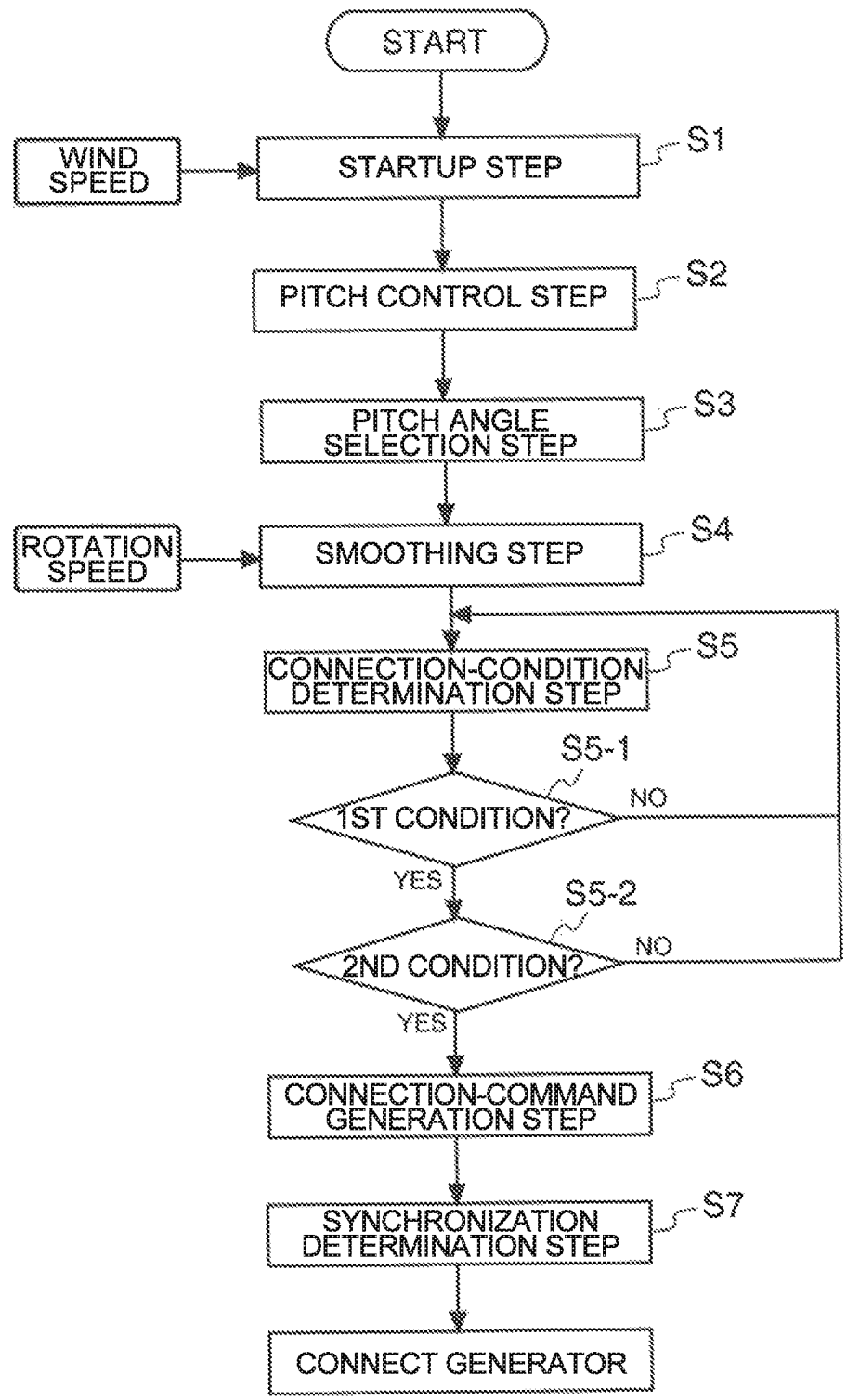
FIG. 5 is a flowchart schematically showing a method of connecting a wind turbine power generating apparatus according to an embodiment.
Figure 6:
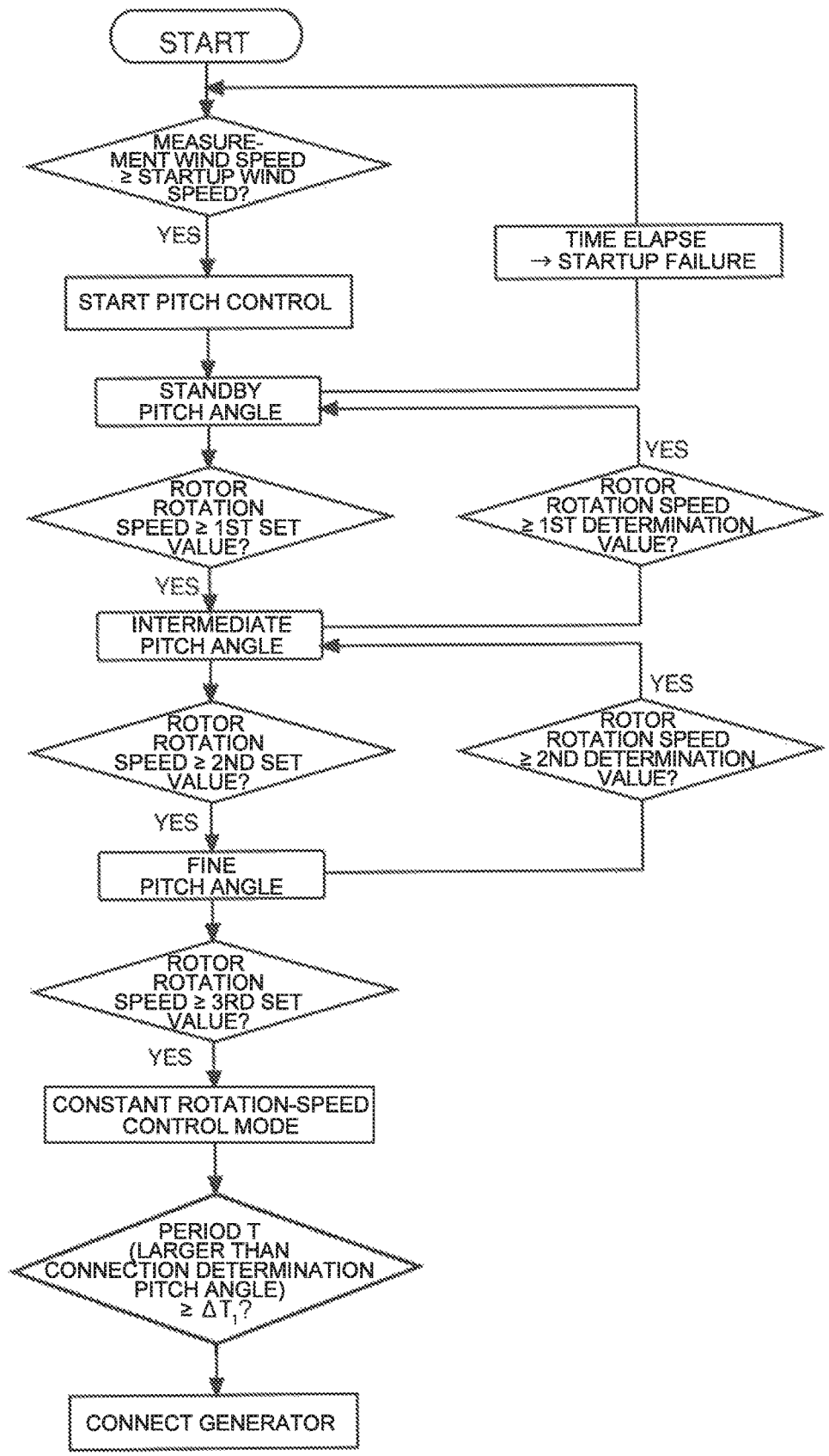
FIG. 6 is a flowchart showing a specific example of a method of connecting a wind turbine power generating apparatus according to an embodiment.

Next, with reference to FIGS. 5 and 6, a method of connecting the wind turbine power generating apparatus 1 according to some embodiments will be described. FIG. 5 is a flowchart schematically showing a method of connecting a wind turbine power generating apparatus according to an embodiment. FIG. 6 is a flowchart specifically showing a method of connecting a wind turbine power generating apparatus according to an embodiment. In the following description, the reference signs illustrated in FIG. 1 will be used where appropriate.

As described above, the wind turbine power generating apparatus 1 includes the wind turbine rotor 2 including the at least one blade 3, the pitch drive part 20 for changing the pitch angle of the at least one blade 3, the generator 7 configured to be driven by rotation energy of the wind turbine rotor 2, and the circuit breaker 10 for switching a connection state of the generator 7 to the grid 100.

The method of connecting the wind turbine power generating apparatus 1 according to some embodiments includes a pitch control step S2, a connection-condition determination step S5, and a connection-command generation step S6.

The method of connecting the wind turbine power generating apparatus 1 may further includes at least one of a starting step S1, a smoothing step S4, a pitch-angle selection step S3, or a synchronization determination step S7.

In the starting step S1, the wind turbine power generating apparatus 1 is started if a mean value of wind speed (mean wind speed) in a predetermined time measured by the anemometer 26 exceeds a startup wind speed set in advance.

In the pitch control step S2, the pitch drive part 20 is controlled in the constant rotation-speed control mode for maintaining the rotation speed of the wind turbine rotor 2 at a target rotation speed, before connection of the generator 7.

In the connection-condition determination step S5, it is determined whether a connection determination condition is satisfied (S5-1), the connection determination condition at least including the first condition that, while the pitch drive part 20 is being controlled in the constant rotation-speed control mode, a pitch angle is at a feather side of a connection determination pitch angle continuously for a period of $\Delta T_1$ or longer. In addition, in the connection-condition determination step S5, it may be determined whether a connection determination condition is satisfied (S5-2), the connection determination condition further including the second condition that, a difference between the rotation speed of the wind turbine rotor 2 and the target rotation speed falls within an allowable range continuously for a period of $\Delta T_2$ or longer.

In the connection-command generation step S6, the circuit breaker 10 is provided with a connection command to connect the generator 7 to the grid 100 if it is determined that the connection-determination condition is satisfied in the connection-condition determination step S5.

According to the above method, in the pitch control step S2, the pitch drive part is controlled in the constant rotation-speed control mode for maintaining the rotation speed of the wind turbine rotor 2 at a target rotation speed, before connection of the generator 7.

In this way, it is possible to avoid an excessive increase in the rotation speed of the wind turbine rotor 2, and to quickly adjust the rotation speed of the wind turbine rotor 2 to a target rotation speed suitable for connection of the generator 7. Further, as compared to connection in midst of an increase of the rotation speed, connection at a rotation speed controlled to be constant is relatively easy, which makes it possible to reduce the risk of connection failure.

Further, according to the above method, it is determined whether the connection determination condition including at least the first condition is satisfied in the connection-condition determination step S5, and if satisfied, the circuit breaker 10 is provided with a connection command to connect the generator 7 to the grid 100 in the connection-command generation step S6.

According to the above method, it is possible to determine, from a pitch angle, whether a sufficient wind speed is achieved for the entire rotor plane of the wind turbine rotor 2 when the generator 7 is to be connected. In this way, it is possible to prevent disconnection of the generator 7 and repetition of disconnection and connection of the generator 7 immediately after connection, which makes it possible to reduce switching frequency of the circuit breaker 10 to prevent a decrease in the lifetime of the circuit breaker 10, and to maintain a stable connection state of the wind turbine power generating apparatus 1 to the grid 100.

In the pitch-angle selection step S3, a connection determination pitch angle to be used as a connection determination condition is selected from among a plurality of kinds of connection determination pitch angles.

As described above, a connection determination pitch angle is suitably selected in accordance with a state (e.g. the switching frequency) of the circuit breaker 10, which makes it possible to reduce unnecessary switching of the circuit breaker.

Further, a connection determination pitch angle selected from among a plurality of kinds of connection determination pitch angles to be used as the connection determination condition is changed suitably in accordance with experience. Accordingly, it is possible to set a suitable connection-determination condition corresponding to the surrounding environment of the wind turbine power generating apparatus 1.

In this case, in the pitch-angle selection step S3, a connection determination pitch angle may be selected in accordance with the cumulative switching number of the circuit breaker 10.

Accordingly, it is possible to reduce unnecessary switching of the circuit breaker 10 more effectively. For instance, if the cumulative switching number of the circuit breaker 10 is close to a number corresponding to the lifetime, selecting a connection determination pitch angle closer to the feather side from among the plurality of kinds of connection determination pitch angles makes it possible to reduce the cumulative switching number of the circuit breaker 10 securely and to extend the lifetime of the circuit breaker 10. In contrast, if the cumulative switching number of the circuit breaker 10 is small and power generation is to be prioritized, a connection determination pitch angle closer to the fine side may be selected from among the plurality of kinds of connection determination pitch angles.

In the smoothing step S4, a pitch angle while the pitch drive part 20 is being controlled in the constant rotation-speed control mode is smoothed to obtain a smoothed pitch angle.

In this case, in the above connection-condition determination step S5, the smoothed pitch angle is compared with the connection determination pitch angle, in determination of whether the first condition is satisfied.

In this way, after connection of the generator 7, over rotation of the generator 7 is prevented even in a condition of a high wind speed, which enables smooth supply of electric power to the wind turbine power generating apparatus 1.

In the pitch control step S2, a change rate of the pitch angle changing toward the fine side after connection of the generator 7 may be limited to be not greater than an upper limit value.

In this way, after connection of the generator 7, over rotation of the generator 7 is prevented even in a condition of a high wind speed, which enables smooth supply of electric power to the wind turbine power generating apparatus 1.

With reference to FIG. 6, a method of connecting the wind turbine power generating apparatus 1 according to an embodiment will be described specifically. FIGS. 1 to 3 will be also referred to where appropriate.

First, the wind turbine power generating apparatus 1 is started and pitch control is started, if a mean value (mean wind speed) in the predetermined time of wind speed measured by the anemometer 26 exceeds a startup wind speed set in advance. Specifically, in FIG. 3, a standby state shifts to a startup state. At this time, in the embodiment illustrated in FIG. 3, the pitch drive part 20 is controlled in accordance with a pitch schedule control mode (a). Specifically, the pitch angle is changed from the feather side toward the fine side at a constant pitch rate.

If the pitch angle reaches a standby pitch angle, the pitch angle is maintained, and it is determined whether the rotor rotation speed has increased to the first set value (pitch standby rotation speed). Here, time from when the pitch angle starts to be maintained constant is recorded, and if the time exceeds a preset predetermined time, it is determined that a startup has failed, and the process returns to a standby state.

If the rotor rotation speed increases to the first set value in the predetermined time, the pitch angle is changed to an intermediate pitch angle at a constant pitch rate (pitch schedule control mode (a)). The intermediate pitch angle is greater than the standby pitch angle.

If the pitch angle reaches the intermediate pitch angle, it is determined whether the rotor rotation speed has increased to the second set value. The second set value is a rotation speed larger than the first set value.

If the rotor rotation speed is at least the second set value, the pitch angle is changed to a fine pitch angle at a constant pitch rate (pitch schedule control mode (a)).

If the rotor rotation speed is smaller than the first determination value when the pitch angle reaches the intermediate pitch angle, the pitch angle of the blades 3 may be returned to the standby pitch angle. The first determination value is a rotation speed smaller than the first set value.

If the pitch angle reaches the fine pitch angle, it is determined whether the rotor rotation speed has increased to the third set value. The third set value is a rotation speed larger than the second set value.

If the rotor rotation speed is at least the third set value, the pitch angle is adjusted in accordance with the constant rotation-speed control mode (b).

It is determined whether a connection determination condition is satisfied, the connection determination condition including the first condition that, a pitch angle in the constant rotation-speed control mode (b) is at the feather side of the connection determination pitch angle continuously for a preset period of $\Delta T_1$ or longer, and if the connection determination condition is satisfied, a connection command is generated and the generator 7 is connected to the grid 100.

As described above, it is possible to prevent disconnection of the generator 7 and repetition of disconnection and connection of the generator 7 immediately after connection, which makes it possible to reduce switching frequency of the circuit breaker 10 to prevent a decrease in the lifetime of the circuit breaker 10, and to maintain a stable connection state of the wind turbine power generating apparatus 1 to the grid 100.

Embodiments of the present invention were described in detail above, but the present invention is not limited thereto, and various amendments and modifications may be implemented within a scope that does not depart from the present invention. For instance, some of the above embodiments may be combined.

The invention claimed is:

1. A wind turbine power generating apparatus for generating electric power from wind energy, comprising:
    a wind turbine rotor including at least one blade;
    a pitch drive part for changing a pitch angle of the at least one blade;
    a generator configured to be driven by rotational energy of the wind turbine rotor;
    a circuit breaker for switching a connection state of the generator with respect to a utility grid; and
    a controller for controlling the wind turbine power generating apparatus, the controller including a pitch control part configured to control the pitch drive part in a constant rotation-speed control mode for maintaining a rotation speed of the wind turbine rotor at a target rotation speed, before connection of the generator,
    a connection-condition determination part configured to determine whether a connection determination condition is satisfied before the connection of the generator, the connection determination condition including at least a first condition that, while the pitch drive part is controlled in the constant rotation-speed control mode, the pitch angle is at a feather side of a connection-determination pitch angle continuously for a period of $\Delta T_1$ or longer, and
    a connection-command generation part configured to provide the circuit breaker with a connection command to connect the generator to the utility grid, if the connection-condition determination part determines that the connection determination condition is satisfied.

2. The wind turbine power generating apparatus according to claim 1,
    wherein the connection determination condition further includes a second condition that, while the pitch drive part is controlled in the constant rotation-speed control mode, a difference between the rotation speed of the wind turbine rotor and the target rotation speed is within an allowable range continuously for a period of $\Delta T_2$ or longer.

3. The wind turbine power generating apparatus according to claim 1,
    wherein the controller further includes a pitch-angle selection part configured to select the connection-determination pitch angle to be used as the connection determination condition, from among a plurality of kinds of connection determination pitch angles.

4. The wind turbine power generating apparatus according to claim 3,
    wherein the pitch angle selection part is configured to select the connection-determination pitch angle on a basis of a cumulative switching number of the circuit breaker.

5. The wind turbine power generating apparatus according to claim 1,
    wherein the controller further includes a smoothing part configured to smooth the pitch angle while the pitch drive part is controlled in the constant rotation-speed control mode to obtain a smoothed pitch angle, and
    wherein the connection-condition determination part is configured to compare the smoothed pitch angle with the connection determination pitch angle in determination of whether the first condition is satisfied.

6. The wind turbine power generating apparatus according to claim 1,
    wherein the controller further includes a stop-command generation part configured to generate a stop command for the wind turbine power generating apparatus to shift to a stop mode if the rotation speed exceeds a threshold value greater than a connection schedule rotation speed at which the generator is to be connected.

7. The wind turbine power generating apparatus according to claim 1,
    wherein the pitch control part includes a pitch rate limiter for limiting a change rate of the pitch angle changing toward a fine side after connection of the generator to be not greater than an upper limit value.

8. The wind turbine power generating apparatus according to claim 1,
    wherein the controller further comprises a synchronization determination part configured to, if the connection command from the connection-command generation part is received, determine whether a difference between a voltage, a phase, and a frequency of the generator and a voltage, a phase, and a frequency of the utility grid is within a synchronization-enabled range, and
    wherein the circuit breaker is configured to be closed if the synchronization determination part determines that the difference is within the synchronization-enabled range.

9. The wind turbine power generating apparatus according to claim 1,
    wherein the pitch control part is configured to control the pitch drive part so as to change the pitch angle toward the feather side to maintain the pitch angle at a standby pitch angle, if the rotation speed decreases to a disconnection rotation speed or lower and the generator is disconnected.

10. The wind turbine power generating apparatus according to claim 1,
    wherein the pitch control part is configured to control the pitch drive part in the constant rotation-speed control mode by feedback control for maintaining the rotation speed of the wind turbine rotor at the target rotation speed.

11. A method of connecting a wind turbine power generating apparatus comprising: a wind turbine rotor including at least one blade; a pitch drive part for changing a pitch angle of the at least one blade; a generator configured to be driven by rotational energy of the wind turbine rotor; and a circuit breaker for switching a connection state of the generator with respect to a utility grid, the method comprising:

a pitch control step of controlling the pitch drive part in a constant rotation-speed control mode for maintaining a rotation speed of the wind turbine rotor at a target rotation speed, before connection of the generator;

a connection-condition determination step of determining whether at least a connection determination condition is satisfied before the connection of the generator, the connection determination condition including a first condition that, while the pitch drive part is controlled in the constant rotation-speed control mode, the pitch angle is at a feather side of a connection-determination pitch angle continuously for a period of $\Delta T_1$ or longer; and a connection-command generation step of providing the circuit breaker with a connection command to connect the generator to the utility grid, if the connection determination condition is determined to be satisfied in the connection-condition determination step.

12. The method of connecting a wind turbine power generating apparatus according to claim 11,
wherein the connection determination condition further includes a second condition that, while the pitch drive part is controlled in the constant rotation-speed control mode, a difference between the rotation speed of the wind turbine rotor and the target rotation speed is within an allowable range continuously for a period of $\Delta T_2$ or longer.

13. The method of connecting a wind turbine power generating apparatus according to claim 11, further comprising
a pitch-angle selection step of selecting the connection-determination pitch angle to be used as the connection determination condition, from among a plurality of kinds of connection determination pitch angles.

14. The method of connecting a wind turbine power generating apparatus according to claim 13,
the pitch-angle selection step comprises selecting the connection-determination pitch angle on a basis of a cumulative switching number of the circuit breaker.

15. The method of connecting a wind turbine power generating apparatus according to claim 11, further comprising
a smoothing step of smoothing the pitch angle while the pitch drive part is controlled in the constant rotation-speed control mode to obtain a smoothed pitch angle,
wherein the connection-condition determination step comprises comparing the smoothed pitch angle with the connection determination pitch angle in determination of whether the first condition is satisfied.

16. The method of connecting a wind turbine power generating apparatus according to claim 11,
wherein the pitch control step comprises limiting a change rate of the pitch angle toward a fine side after connection of the generator to be not greater than an upper limit value.

* * * * *